United States Patent
Johnson

(10) Patent No.: US 6,608,829 B1
(45) Date of Patent: Aug. 19, 2003

(54) CLOSED-LOOP SYNCHRONIZATION ARRANGEMENT FOR DATA TRANSMISSION SYSTEM

(75) Inventor: Ian David Johnson, Mossley (GB)

(73) Assignee: Xyratex Technology Limited, Havant (GB)

( * ) Notice: Subject to any disclaimer, the term of this patent is extended or adjusted under 35 U.S.C. 154(b) by 0 days.

(21) Appl. No.: 09/402,694

(22) PCT Filed: Mar. 30, 1998

(86) PCT No.: PCT/GB98/00952
§ 371 (c)(1),
(2), (4) Date: Oct. 8, 1999

(87) PCT Pub. No.: WO98/45973
PCT Pub. Date: Oct. 15, 1998

(30) Foreign Application Priority Data

Apr. 8, 1997 (GB) ................................................ 9707094

(51) Int. Cl.[7] .................................................. H04J 3/06
(52) U.S. Cl. ........................................ 370/350; 370/514
(58) Field of Search ................................. 370/304, 324, 370/350, 360, 362, 386, 396, 398, 395.62, 358; 375/220, 145, 367; 327/141, 144

(56) References Cited

U.S. PATENT DOCUMENTS

| | | | | |
|---|---|---|---|---|
| 3,823,401 | A | * 7/1974 | Berg et al. .................... | 343/204 |
| 4,486,739 | A | 12/1984 | Franaszek et al. ........... | 340/347 |
| 4,539,678 | A | * 9/1985 | Ambroise et al. ............ | 370/86 |
| 4,694,472 | A | 9/1987 | Torok et al. ................. | 375/107 |
| 5,604,735 | A | 2/1997 | Levinson et al. ........... | 370/360 |

FOREIGN PATENT DOCUMENTS

| | | |
|---|---|---|
| EP | 0261476 | 8/1988 |
| EP | 0642238 | 3/1995 |
| JP | 6327072 | 11/1994 |

OTHER PUBLICATIONS

XP–002071624 "Objectifs de performances pour la snchronisation due reseau national Performance objective for the national network synchronization" by Julio et al.

"A 2 Gb/s Asymmetric Serial Link for High–Bandwidth Packet Switches" by Chang et al. pp. 1–9.

"A 2.5Gb/s Bidirectional signaling Technology" by Haycock et al. pp. 1–8; Hot Interconnects Symposium V; Aug. 21–23, 1997.

"A Tracking Clock Recovery Receiver for 4Gb/s Signaling"—Extended Abstract by Poulton et al; pp. 1–12.

* cited by examiner

Primary Examiner—Wellington Chin
Assistant Examiner—Brenda Pham
(74) Attorney, Agent, or Firm—Pillsbury Winthrop LLP

(57) ABSTRACT

A synchronizing arrangement for a closed-loop data transmission system includes a central data switch and a plurality of transceivers which may be interconnected by way of the switch for the transmission of data between them. The central data switch includes a clock generator, and a plurality of ports, each of which includes a transmitter, a receiver, a phase detector and a phase encoder. Each transceiver includes a data transmitter, a data receiver and a synchronizing means operable to maintain synchronism between the transceiver and the data port. A common reference oscillator provides frequency reference signals to the central data switch, each data port and each transceiver.

5 Claims, 2 Drawing Sheets

CLOSED-LOOP SYNCHRONIZATION ARRANGEMENT FOR DATA TRANSMISSION SYSTEM

This application is the National Phase of International Application PCT/GB98/00952 filed Mar. 30, 1998 which designated the U.S. and that International Application was published in English under PCT Article 21(2) on Oct. 15, 1998 as International Publication No. WO 98/45973. PCT/GB98/00952 claims priority to British Application No. 9707094.0, filed Apr. 8, 1997. The entire contents of these applications are incorporated herein by reference.

FIELD OF THE INVENTION

This invention relates to a closed-loop synchronisation arrangement for a data transmission system, and in particular to an arrangement for a system which incorporates a high-speed multi-point full-duplex serial data switch.

BACKGROUND OF THE INVENTION

High-speed multi-point full duplex serial data switches are well known in various forms, the switch being operable to change the interconnections between the outstations. One of the problems with such switches is the need to provide synchronisation between a central data switch and the outstations to and from which data is to be transmitted and received. Conventional asynchronous switches have to make provision for the regeneration of clock pulses at each receiver and for the synchronisation of these with the incoming data flow each time that the data flow stops and is restarted. This occurs each time that the switch configuration is changed. Such a requirement for synchronisation makes it necessary to provide a lock and capture time period during which no useful data may be passed, thus reducing the overall efficiency of the system. Whilst an alternative is to distribute clock pulses from a central clock to all outstations there are inherent difficulties in maintaining synchronisation due to noise, jitter, inherent delays, device tolerances, power supply and temperature variations and other problems. The paper given by De Ulio et al at the International Switching Symposium in Paris from the May 7–11 1979, entitled "Performance Objectives for the national network synchronization", and reported at pages 559 to 566, relates to a system having a central reference oscillator, which is subject to just these problems. Japanese Patent publication JP-A-06327072 and Patent Abstracts of Japan, vol. 095, no. 002, Mar. 31, 1995 discloses a system in which closed-loop synchronisation is provided by detecting phase errors at a host station and transmitting an error signal to a synchronising clock at a substation, the synchronising clock providing timing signals to both the transmitter and the receiver of the substation.

SUMMARY OF THE INVENTION

It is an object of the invention to provide a closed-loop synchronisation arrangement for a data transmission system in which a central data switch and any of a plurality of data transceivers are maintained in constant synchronisation.

According to the present invention there is provided a closed-loop synchronisation arrangement for a data transmission system which includes a data switch including a clock generator and a plurality of ports each connecting the data switch to a separate transceiver, each port comprising a data transmitter, a data receiver, phase discrimination means connected between the switch data receiver and the switch data transmitter and operable to detect phase differences between the signals received by the data port receiver and those generated by the switch clock generator to generate a synchronising code for transmission to the transceiver, the transceiver comprising a data transmitter and a data receiver and synchronising means responsive to the synchronising code received by the receiver of the transceiver to adjust the phase of the data transmitted by the transmitter of the transceiver so as to maintain substantial synchronism with the associated switch data port, and a reference oscillator operable to provide a frequency reference signal to each part of the data transmission system.

In this specification the term "transceiver" is used to denote an outstation comprising a data transmitter and receiver which may be connected to one or more other such transmitters and receivers by way of the central data switch.

BRIEF DESCRIPTION OF THE DRAWINGS

The invention will now be described with reference to the accompanying drawings.

DETAILED DESCRIPTION OF THE ILLUSTRATED EMBODIMENTS

Figure 1:
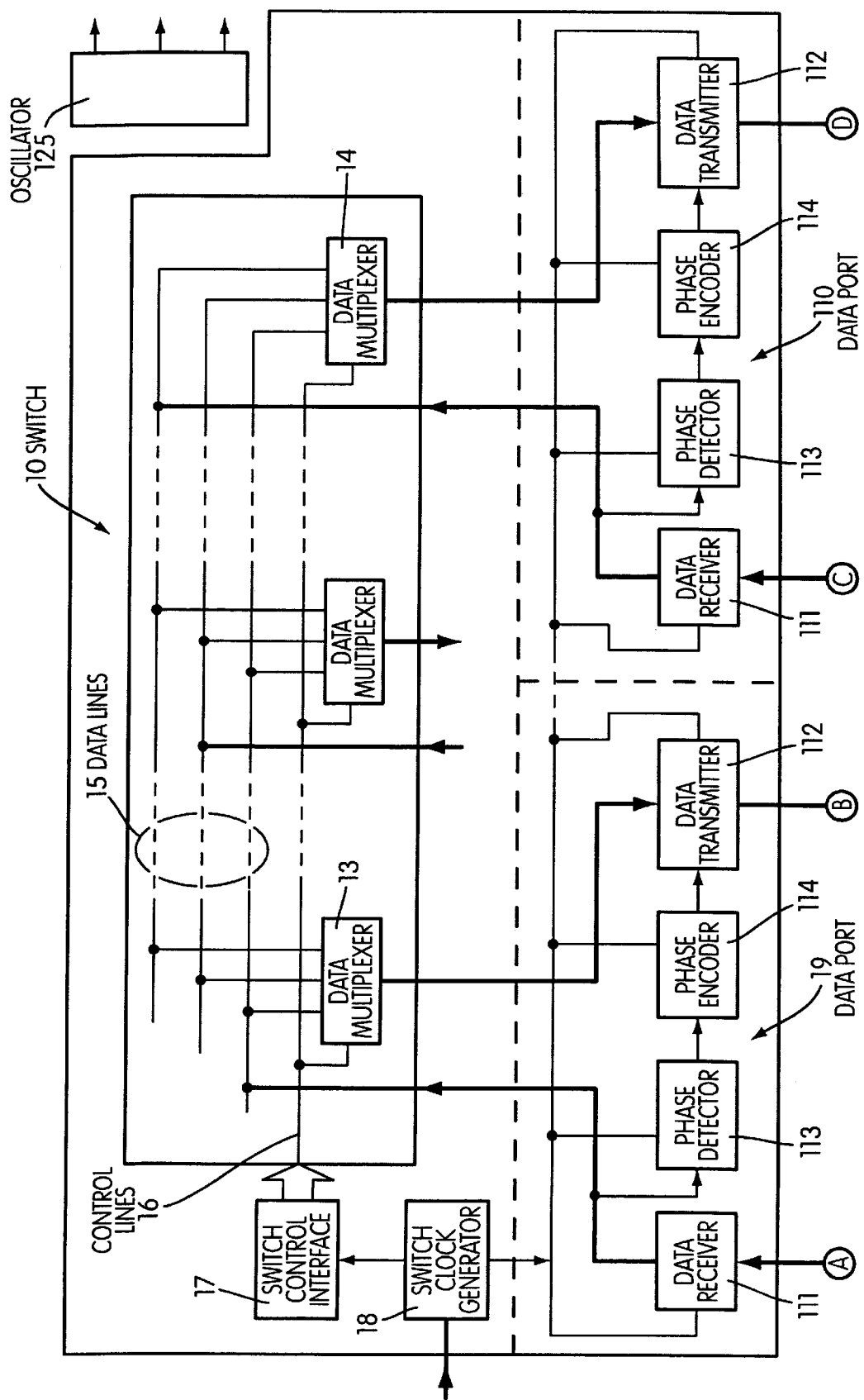
FIG. 1 shows a block diagram of an embodiment of a single switch.
Figure 2:
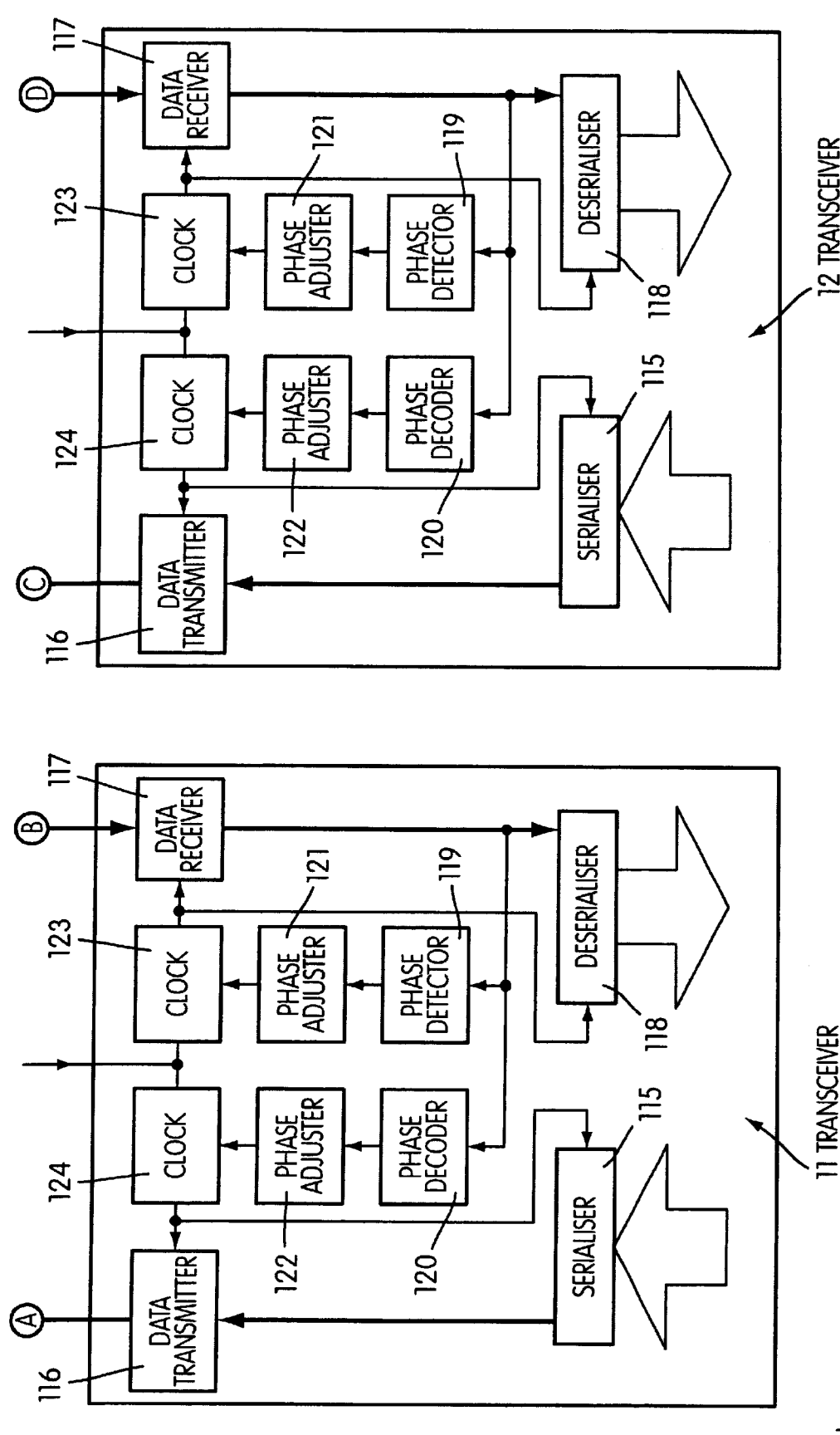
FIG. 2 shows a block diagram of an embodiment of two transceivers connected to the single switch shown in FIG. 1.

As shown in FIGS. 1 and 2, as the switch 10 is arranged for connection to a number of separate transceivers, of which two are shown at 11 and 12. Referring to FIG. 1, the switch 10 comprises a number of data multiplexers 13 and 14, on for each associated transceiver, data lines 15 common to all multiplexers and control lines 16. The control lines 16 are connected to a switch control interface 17. A switch clock generator 18 is provided, supplying clock pulses to the switch control interface 17 and other elements of the switch at appropriate frequencies.

Each multiplexer is connected to a data port 19 and 110 respectively. Each data port comprises a data receiver 111, arranged to receive data from an associated transceiver and a data transmitter 112 arranged to transmit data to the associated transceiver. A phase detector 113 is connected to the output of the data receiver 111 and provides an output to a phase encoder 114, itself providing an input to the data transmitter 112. The data receiver 111, data transmitter 112. phase detector 113 and phase encoder 114 are all supplied with clock pulses from the switch clock generator 18.

Each transceiver is arranged in the same manner and only transceiver 11 will be described in detail. As shown in FIG. 2, data from an external source which is to be transmitted to another transceiver is applied to a serialiser 115 which converts the data into serial form. The serial data is applied at the appropriate time to a transceiver data transmitter 116 for transmission to the data port receiver 111. Similarly, data transceived from the data port transmitter 112 is received by a transceiver data receiver 117, from whence it passes to a deserialiser 118 and thence to the external destination. The output of receiver 117 is also applied to a phase detector 119 and a phase decoder 120, both of which are connected to separate phase adjusters 121 and 122. The phase adjuster 121 is connected to the transceiver receiver internal clock 123, whilst the phase adjuster 122 is connected to the transceiver transmitter internal clock 124.

Each transceiver is arranged in the same manner and only transceiver 11 will be described in detail. Data from an external source which is to be transmitted to another transceiver is applied to a serialiser 115 which converts the data into serial form. The serial data is applied at the appropriate time to a transceiver data transmitter 116 for transmission to the data port receiver 111. Similarly, data transmitted from the data port transmitter 112 is received by a transceiver data receiver 117, from whence it passes to a deserialiser 118 and thence to the external destination. The output of receiver 117 is also applied to a phase detector 119 and a phase decoder 120, both of which are connected to separate phase adjusters 121 and 122. The phase adjuster 121 is connected to the transceiver receiver internal clock 123, whilst the phase adjuster 122 is connected to the transceiver transmitter internal clock 124.

The remaining feature of the system is a common system reference oscillator 125 which provides a frequency reference source to the switch 10, and data ports 19 and 110 via the switch clock generator 18 and to all transceiver internal clocks such as clocks 123 and 124.

The transmission bit stream pattern will always consist of a series of data bits between which is a pattern of synchronising bits. The number of successive bits of data and the number of synchronising bits between them may be varied. The bit rate is determined by the common reference oscillator 125. Because of the use of a common reference oscillator, all internal clocks will be operating at the same frequency but there will be phase differences between the clocks in different parts of the system because of the factors mentioned above such as inherent delays and so on.

Initially, for example on switch-on or following an external reset or other command, there will be a synchronisation start-up period between the data switch and each individual transceiver. Synchronisation between the switch and each transceiver is initially carried out over a closed loop, all such loops being necessarily independent of each other because of the clock phase differences between them due to the factors mentioned above such as inherent delays and so on. Such synchronisation set-up may be made simultaneously to any or all switch/transceiver closed loops and once set up will be continually maintained.

At start-up, each switch port transmitter 112 will transmit a synchronising bit stream consisting of a set of fixed all-high or allow data bits between which is a pattern of synchronising bits containing a high-to-low or low-to-high edge. The direction of this synchronising edge is alternated between successive such bits streams. The patterns received at each transceiver receiver 117 may be out of phase with respect to each other by many clock beats. The output of receiver 117 is checked by the phase detector 119 for any phase error between the received signal and the receiver clock 123. Phase detector 119 consists of a coarse sampler and a fine sampler operating together at some multiple of the common system frequency reference 125 so as to detect the alternate rising or falling edge within the synchronising pattern and thereby determine the phase error between the received signal and the receiver clock 123 to within a small time window.

Once the switch-to-transceiver link has been synchronised the return link from the transceiver to the switch may be synchronised. Transmitter 116 of the transceiver transmits a similar synchronising pattern to receiver 110 of the switch consisting of an edge within the synchronising bit period which alternates between high-to-low and low-to-high on successive data periods. The phase detector 113 of the switch detects any phase difference between the received pattern and the switch clock provided by generator 18. The detected phase difference causes the generation by the phase encoder 114 of a pattern of synchronising bits which indicates the direction of the required phase adjustment. This bit pattern replaces the alternating edge pattern which was transmitted previously and is transmitted by data port transmitter 112 to receiver 117 of the transceiver. This bit pattern now serves two purposes. Firstly, the edge itself is used to maintain the transceiver's synchronisation and, secondly, the direction of the edge as detected by the phase decoder 120 of the transceiver and, via the phase adjuster 122, adjusts the phase of the transceiver transmitter clock 124. The bit stream received by receiver 111 of the switch is continually checked in this manner and adjustments made until there is substantial synchronism between the transceiver and the data port of the switch irrespective of actual individual paths around each switch/transceiver closed loop pair. The above process operates simultaneously for each transceiver and is a continuous process.

After the set-up period in which synchronisation is achieved in both directions for all switch/transceiver closed-loop pairs, real data may replace the fixed all-high or all-low part of the bit stream.

One further advantage of the data transmission system described above is that the data being transmitted from one transceiver to another is regenerated each time it passes through a data port, thus increasing the integrity of the data transmission system.

It is possible for the configuration of the switch to be changed during any period in which the synchronising bits are being transmitted without interruption of the data flow between transceivers due to such changes. This provides a known and fixed latency across the switch for any specific embodiment of the invention.

Nothing has been said about the manner in which the configuration of the switch is set up or changed, as this is not within the scope of the present invention. However, the configuration may be set up and changed by means which are already known in the art.

It will be clear that the data transmission system may comprise any desired number of transceivers connected to a central data switch so as to provide any combination of point-to-point or unicast, multicast or broadcast full duplex connections between them.

What is claimed is:

1. A closed-loop synchronisation arrangement for a data transmission system, which arrangement includes a central data switch including a clock generator and a plurality of data ports each connecting the data switch to a separate one of a plurality of transceivers, each data port comprising a data transmitter, a data receiver, phase discrimination means connected between the data port receiver and the data port transmitter and operable to detect phase differences between the signals received by the data port receiver and those generated by the switch clock generator to generate a synchronising code pattern for transmission to a transceiver, each transceiver comprising a data transmitter and a data receiver; and a reference oscillator operable to provide a frequency reference signal to each part of the data transmission system, characterized in that each transceiver also includes separate transmit and receive clocks, first synchronising means responsive to the synchronising code pattern received by the receiver of the transceiver to adjust the phase of the receive clock so that synchronisation between the data transmitter of the data switch port and the data receiver of the transceiver is established and maintained and second synchronising means responsive to the synchronisation between the data receiver of the data switch port and the data transmitter of the transceiver is established and maintained.

2. An arrangement as claims in claim 1, characterized in that the phase discrimination means of each data port includes a phase detector operable to detect the relative phase of a received signal and a phase encoder operable to generate a synchronising code pattern indicative of the phase error between the received signal and signals generated by the switch clock generator.

3. An arrangement as claimed in claim 1, characterized in that each transceiver includes means for receiving data from an external source for transmission via the central data switch to one or more of the other transceivers and means for transmitting to an external destination data received via the central data switch from other transceivers.

4. An arrangement as claimed in claim 1, characterized in that data is transferred between the data switch and any transceiver in a full duplex manner.

5. An arrangement as claimed in any one of claims 1 to 4 characterised in that changes to the switch configuration are made during the synchronisation period.

* * * * *